United States Patent
Gnech et al.

(10) Patent No.: US 10,671,488 B2
(45) Date of Patent: Jun. 2, 2020

(54) DATABASE IN-MEMORY PROTECTION SYSTEM

(71) Applicant: International Business Machines Corporation, Armonk, NY (US)

(72) Inventors: Thomas H. Gnech, Boeblingen (DE); Joerg Mueller, Boeblingen (DE); Thomas Prause, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1407 days.

(21) Appl. No.: 14/089,867

(22) Filed: Nov. 26, 2013

(65) Prior Publication Data

US 2014/0164335 A1    Jun. 12, 2014

(30) Foreign Application Priority Data

Dec. 10, 2012    (GB) .................................. 1222142.0

(51) Int. Cl.
*G06F 17/00* (2019.01)
*G06F 11/14* (2006.01)

(52) U.S. Cl.
CPC ...... *G06F 11/1456* (2013.01); *G06F 11/1458* (2013.01); *G06F 11/1461* (2013.01);
(Continued)

(58) Field of Classification Search
CPC ......... G06F 17/30106; G06F 17/30194; G06F 17/30233
(Continued)

(56) References Cited

U.S. PATENT DOCUMENTS 8,286,030 B1 * 10/2012 Chatterjee ......... G06F 17/30008
707/674
9,690,809 B1 * 6/2017 Chai ....................... G06F 16/21
(Continued)

FOREIGN PATENT DOCUMENTS

KR    20020047601 A    6/2002

OTHER PUBLICATIONS

Camargos, Lasaro, et al.; "A Primary-Backup Protocol for In-Memory Database Replication"; 5th IEEE International Symposium on Networking Computing and Applications (NCA '2006); p. 204-211; 2006.
(Continued)

*Primary Examiner* — Tyler J Torgrimson
(74) *Attorney, Agent, or Firm* — Cantor Colburn LLP; Christopher Pignato

(57) ABSTRACT

A computer-implemented process provides data protection of an in-memory database. The method may include triggering the securing of data of the in-memory database to a first savepoint; securing data of the in-memory database to the first savepoint; and backing up the data of the first savepoint on a persistent storage medium. The data of the first savepoint may be stored on a first persistent medium and the backup data of the first savepoint are stored on a second persistent storage medium. The availability of two different savepoint data on physically different storage media increases the probability of having always savepoint data ready for recovery purposes dramatically. By using different storage media, even in cases of a hardware damage savepoint data will be available.

11 Claims, 3 Drawing Sheets

(52) U.S. Cl.
CPC ...... *G06F 2201/80* (2013.01); *G06F 2201/82* (2013.01); *G06F 2201/84* (2013.01)

(58) Field of Classification Search
USPC .......................................... 707/640, 652, 654
See application file for complete search history.

(56) References Cited

U.S. PATENT DOCUMENTS

| | | | |
|---|---|---|---|
| 2003/0061537 A1* | 3/2003 | Cha | G06F 11/1471 714/16 |
| 2004/0230793 A1* | 11/2004 | Estrada | H04L 29/06027 713/156 |
| 2005/0071586 A1* | 3/2005 | Bartfai | G06F 12/0826 711/162 |
| 2005/0131990 A1* | 6/2005 | Jewell | G06F 11/1464 709/201 |
| 2006/0020635 A1* | 1/2006 | Green | G06F 11/2097 |
| 2007/0143353 A1* | 6/2007 | Chen | G06F 12/0292 |
| 2008/0052327 A1* | 2/2008 | Buah | G06F 11/1482 |
| 2008/0123607 A1* | 5/2008 | Jokela | H04L 47/15 370/338 |
| 2008/0244204 A1* | 10/2008 | Cremelie | G06F 11/2097 711/162 |
| 2009/0063579 A1* | 3/2009 | Chan | G06F 17/30371 |
| 2009/0083339 A1* | 3/2009 | Reed | G06F 11/1471 |
| 2009/0210454 A1* | 8/2009 | Sagar | G06F 17/30212 |
| 2011/0246425 A1* | 10/2011 | Munoz | G06F 11/1458 707/640 |
| 2012/0109895 A1 | 5/2012 | Zwilling et al. | |
| 2012/0124306 A1* | 5/2012 | Abercrombie | G06F 11/1461 711/162 |
| 2012/0136901 A1* | 5/2012 | Raatikka | G06F 17/30368 707/797 |
| 2012/0166490 A1 | 6/2012 | Raatikka | |
| 2012/0173589 A1* | 7/2012 | Kwon | G06F 17/30575 707/803 |
| 2012/0179655 A1 | 7/2012 | Beatty et al. | |
| 2012/0323854 A1* | 12/2012 | Schreter | G06F 11/1461 707/650 |
| 2013/0198139 A1* | 8/2013 | Skidanov | G06F 11/1471 707/649 |
| 2013/0290268 A1* | 10/2013 | Schreter | G06F 17/30371 707/682 |
| 2015/0227577 A1* | 8/2015 | Liu | H04W 24/02 707/634 |

OTHER PUBLICATIONS

Great Britain Search Report dated Jun. 17, 2013 for Application No. 12221472.0.

Mcobject; "In-Memory Database Systems—Questions and Answers"; retrieved on Sep. 24, 2012 from http://www.mcobject.com/index.cfm?fuseaction=page&pageID=622&sectionid=155&printfriendly=1; p. 1-4; 2012.

* cited by examiner

DATABASE IN-MEMORY PROTECTION SYSTEM

PRIORITY

This application claims priority to Great Britain Patent Application No. 1222142.0, filed Dec. 10, 2012, and all the benefits accruing therefrom under 35 U.S.C. § 119, the contents of which in its entirety are herein incorporated by reference.

BACKGROUND

The present invention relates generally to the field of database systems. More specifically, the present invention is related to a method and a system for protecting data of in-memory databases (IMD). Data stored in IMD may need to be recovered for a variety of reasons. It would be advantageous to have a mechanism for providing an improved recovery possibility wherein the recovery may be performed in a short period of time and leads to a more recent content of the IMD compared to taking the backup.

SUMMARY

Embodiments provide a computer-implemented method for data protection of an in-memory database. The method may include triggering the securing of data of the in-memory database to a first savepoint; securing data of the in-memory database to the first savepoint; and backing up the data of the first savepoint on a persistent storage medium.

Additional features and advantages are realized through the techniques of the certain embodiments. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

In the following, illustrative embodiments of the invention will be described in greater detail by way of example, only making reference to the drawings in which.

DETAILED DESCRIPTION

Figure 1:
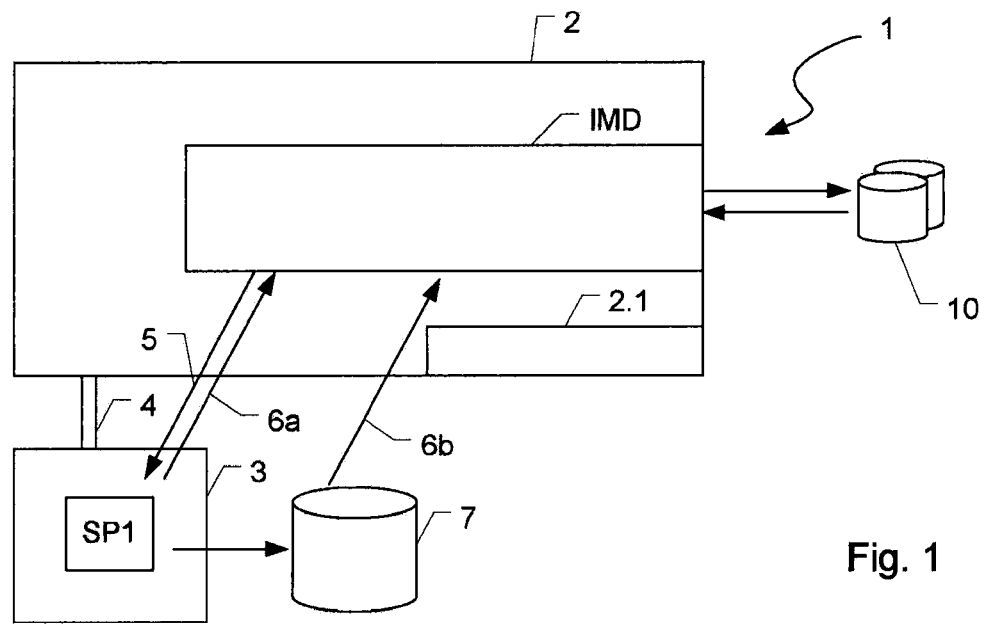
FIG. 1 shows a first schematic architecture of an in-memory database system according to an embodiment of the invention.

Embodiments may be realized in a computer-implemented method for data protection of an in-memory database. The method may include triggering the securing of data of the in-memory database to a first savepoint; securing data of the in-memory database to the first savepoint; and backing up the data of the first savepoint on a persistent storage medium. Therefore, the method provides a savepoint backup which is ready for restoring the in-memory database at any point of time even when the data of the first savepoint are not consistent or damaged. The backup of data of the first savepoint ensures a raised availability of consistent savepoint data for fast recovery purposes. Thereby, the probability of recovering the in-memory database with data of a conventional backup is lowered.

A database management system (DBMS) is an application for storing large volumes of data and allowing multiple users to access and manipulate the data in an efficient and controlled fashion. Regular databases are traditionally considered as a large collection of mainly disk resident shared data, managed and accessed by the DBMS.

Another type of database system is an in-memory database (IMD). In-memory database systems store their content (data and metadata like table structures) in memory, e.g. main storage of the server which runs the IMD logic. The big advantage of using memory as the location of the database content is the very fast access to the content compared to the slow disk storage access of regular databases, i.e. databases storing their content on disk storage, e.g. the hard disk of the computer system.

Usually, for the reason of cost, the memory used to store the IMD content is implemented as volatile memory, whereas disk storage characterizes as persistent storage. The volatile memory increases the probability of database crash since its content gets lost whenever the server which runs the IMD fails, e.g. power failure, whereas persistent storages do not lose its content even if power is switched off for a long period of time.

As known from regular databases, also IMD requires recoverability of the content in case the server which runs the IMD or the IMD itself crashes and its content gets lost or unusable. Thus, prior art backup and restore methods are also applied to IMD. However, these methods are time consuming (hours to days) because of using disk storage. In the case of IMD, disk storage for backups is only acceptable for major backups, e.g. backups running at the end of each month because when performing the backup, the operation of IMD may have to be suspended.

Since the major feature of IMD is fast access, consequently, fast recovery after database crash is strongly required for IMD. This cannot be achieved with above described backup recovery method. Therefore, IMD uses savepoints in order to reduce the recovery time of the database in the presence of a failure of the database. The purpose of savepoints is to provide a consistent image of the data. The savepoints are taken periodically to ensure fast recovery on a most recent status. At initial load time of the IMD, an initial savepoint is taken instantly.

When taking a second, subsequent savepoint, the data of the first savepoint are overwritten or deleted. Thus, there is only one savepoint available at a certain point of time. If the storage containing the savepoint or the savepoint data itself get damaged, recovery is only possible by using a backup saved on the slow storage disk. Using the backup for restoring the database takes hours or days and the content of the backup is pretty old compared to the much recent content of the savepoint. It would therefore be advantageous to have a mechanism for providing an improved recovery possibility wherein the recovery may be performed in a short period of time and leads to a more recent content of the IMD compared to taking the backup.

Embodiments of the invention meet this need in a computer-implemented method for data protection of an in-memory database. The data of the first savepoint may be stored on a first persistent medium and the backup data of the first savepoint are stored on a second persistent storage medium. The availability of two different savepoint data on physically different storage media increases the probability of having always savepoint data ready for recovery purposes dramatically. By using different storage media, even in cases of a hardware damage savepoint data will be available.

The data of the first savepoint may be backed up nearly instantaneously using flashcopy or snapshot technology. Using flashcopy or snapshot technology, a replication of data of the first savepoint within seconds is feasible. The problem is that the first savepoint may be updated even in this short period of time. Therefore some sort of synchronization between the processing within the in-memory database and the generation of backup out of the first savepoint is necessary. If the first savepoint has reached consistency, the replication of data is triggered, i.e. the backup is generated or updated based on the data of the first savepoint. Preferably, backing up the data of the first savepoint is performed by securing data of the first savepoint to a second savepoint. Additionally, backing up the data of the first savepoint after the first savepoint has reached consistency leads to consistent backup data which offers a stabilized data content for recovery purposes at any time.

Backing up the data of the first savepoint may be controlled by a savepoint managing entity which initiates the generation of a snapshot of the first savepoint and the backing up of the snapshot data. Preferably, the server running the in-memory database includes a savepoint managing entity which is adapted to monitor the processing of the in-memory database. If the first savepoint has reached consistency, a snapshot is generated which shows the status of the persistent storage medium at the point of time when the snapshot has been created. Preferably, the snapshot is stored on a second persistent medium. The in-memory database may be recovered based on the data of the first savepoint or the snapshot data.

The data of the second savepoint may be backed up onto a further persistent medium as savepoint backup. The backup may be a prior art backup derived by storing the data of the second savepoint to a hard disk or a set of hard disks. The savepoint backup may be used only for disaster recovery purposes, for example if the whole database system got damaged or lost. In other cases the database may be restored using the first or second savepoint data.

The processes of securing data of the in-memory database to the first savepoint and backing up the data of the second savepoint onto the further persistent medium may be performed simultaneously. While using at least two different savepoints the processes of securing data of the in-memory database to the first savepoint and backing up the data of the second savepoint onto the second persistent medium are decoupled. Therefore it is possible to update the data of the first savepoint while the backup process is performed.

The data of the in-memory database may additionally be backed up by directly storing the data of the in-memory database onto a persistent storage medium, thereby generating a conventional backup. The conventional backup may be used also for disaster recovery purposes, i.e. in case that recovery based on the first savepoint or the backup of data of the first savepoint is not possible.

The in-memory database is typically distributed over multiple computing entities to advantageously increase the processing performance of the distributed database system.

While providing at least two logical savepoints and switching the saving process when the recently updated savepoint has reached consistency, at least one consistent savepoint is provided which may be used for recovery purposes.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the figures illustrate the architecture, functionality, and operation of possible implementations of systems, methods and computer program products according to various embodiments of the present disclosure. In this regard, each block in the block diagrams may represent a module, segment, or portion of code, which includes one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Referring to FIG. 1, an in-memory database system 1 is shown. The in-memory database system 1 includes a server 2 on which the in-memory database IMD is running, i.e. in addition to hard disk, the server includes a memory device which store the data of in-memory database. The memory device may be built by the main memory of the server 2 and/or by at least one solid state drive (SSD). A solid state drive is a data storage device that uses integrated circuit assemblies as memory to store data persistently. As indicated above, in-memory databases provide much faster access to the database content compared to traditional databases using hard-disks for storing data. The server 2 is connected to a storage mean 3 via a bidirectional data bus 4, which is adapted to transmit data from the server 2 to the storage mean 3 and vice versa. The storage mean 3 may be an internal storage of the server 2, e.g. a hard disk or an external storage device.

Furthermore, the server includes a savepoint managing entity 2.1 which is adapted to direct data derived by a savepoint mechanism of the in-memory database IMD to the storage mean 3. Thereby a first savepoint SP1 generated by the savepoint mechanism is saved on the storage mean 3 (as indicated by arrow 5). The first savepoint SP1 includes all data of the in-memory database IMD, i.e. for restoring purposes, the data of the first savepoint SP1 may be load into the memory of the server 2 to rebuild the in-memory database IMD. During the operation of the in-memory database IMD, i.e. while handling queries directed to the in-memory database IMD, the first savepoint SP1 is dynamically updated, wherein only those parts of the first savepoint SP1 are changed which are correlated with changed parts of the in-memory database IMD.

Preferably, the savepoint managing entity 2.1 is adapted to monitor the generation and dynamic update of the first savepoint SP1, especially if the first savepoint SP1 has already reached consistency, i.e. the transfer of data of the in-memory database IMD to the first savepoint SP1 is finished and/or the data has been transferred in a correct manner. Preferably consistency of the first savepoint SP1 is reached at a synchronization point of the database because there are no changes or alterations in the first savepoint SP1. If consistency of the first savepoint SP1 is reached, the data of the first savepoint SP1 are backed up, i.e. the data of the first savepoint SP1 are replicated by transferring and storing the data on a persistent storage medium 7. Thereby the availability of savepoint data for recovery purposes is enhanced because the restoring of data of the in-memory database IMD is possible based on the data of the first savepoint SP1 stored in the storage mean 3 or based on the backed up data contained in persistent storage medium 7.

Preferably the savepoint managing entity 2.1 is adapted to analyze the degree of actuality of the data of the first savepoint SP1 and the backed up data contained in persistent storage medium 7. In addition, the savepoint managing entity 2.1 is adapted to determine if the data of the first savepoint SP1 and the backed up data contained in persistent storage medium 7 are consistent. If restoring of data of the in-memory database IMD is necessary, the savepoint managing entity 2.1 is adapted to decide whether the data of the first savepoint SP1 or the backed up data contained in persistent storage medium 7 should be used for restoring. Preferably, the most actual data are used, i.e. the data of the first savepoint SP1 (as indicated by arrow 6b). If the data of the first savepoint SP1 are damaged, not consistent or even not available (e.g. the storage mean is broken), the restoring of data of the in-memory database IMD is performed based on the data contained in persistent storage medium 7 (as indicated by arrow 6b).

Preferably the backup of data of the first savepoint SP1 is performed using snapshot or flashcopy technology. Using snapshot technology, the status of the file system or the storage medium is frozen at the point of time when the snapshot is created. After the snapshot has been generated, it is possible to use the file system or the storage medium regularly, i.e. the data contained in the file system or storage medium can be modified. Those modifications do not have any impact on the data of the snapshot, i.e. the data remain unchanged. Taking a snapshot of the first savepoint SP1 does not generate a physical copy of the savepoint data but a kind of logical view onto the state of the data at the point of time the snapshot was generated. The access to the physical data of the file system or storage medium at the point of time when the snapshot was created is provided by a designated access entity or access method. Using snapshot technology, the status of the file system or the storage medium is frozen at the point of time when the snapshot is created. After the snapshot has been generated, it is possible to use the file system or the storage medium regularly, i.e. the data contained in the file system or storage medium can be modified. Those modifications do not have any impact on the data of the snapshot, i.e. the data remain unchanged. Taking a snapshot of the first savepoint SP1 does not generate a physical copy of the savepoint data but a kind of logical view onto the state of the data at the point of time the snapshot was generated. The access to the physical data of the file system or storage medium at the point of time when the snapshot was created is provided by a designated access entity or access method.

The upper mentioned flashcopy technology rests upon the snapshot mechanism. When performing a flashcopy, a snapshot is taken of the data of the file system or the storage medium, wherein the whole data are copied to another persistent storage medium. After finishing the copy process a replicated version of the file system or the storage medium is available which is independent of the original file system or the storage medium. Using flashcopy or snapshot technology it is possible to generate point-in-time copies of data, with the copies immediately available for read or write access. Thereby replicating the data of the first savepoint SP1 is feasible within seconds and the interruption of the process of dynamically adapting the data of the first savepoint SP1 is limited to a very short period of time.

In addition, the data of the in-memory database IMD may be secured by using a conventional backup mechanism, i.e. backing up the data without usage of a savepoint mechanism. Thereby the whole data of the in-memory database IMD are transferred to an additional backup storage 10 and stored on the additional backup storage 10. Providing a conventional backup of data of the in-memory database IMD enhances the availability of data. However, using a conventional backup mechanism is very time consuming because disk storage is used and the whole content of the in-memory database IMD must be stored on the disk storage. Furthermore, the backup process has negative impact on the performance of the in-memory database IMD. Therefore, the backing up the data on the additional backup storage 10 is only acceptable for major backups, for example a monthly backup.

Figure 2:
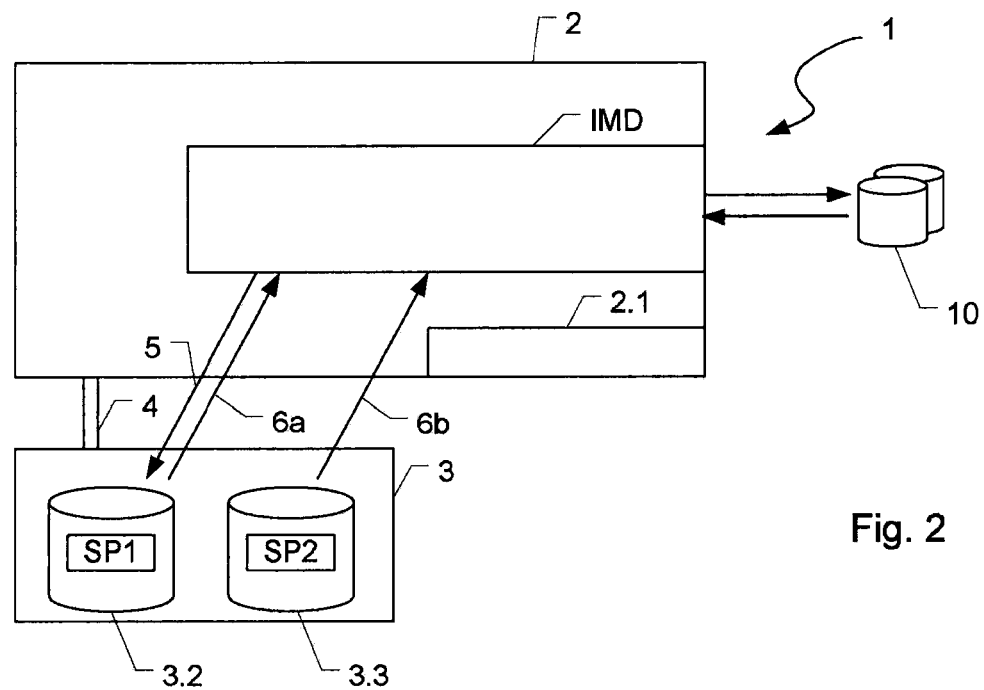
FIG. 2 shows a second schematic architecture of an in-memory database system according to an embodiment of the invention.

Referring to FIG. 2, a second embodiment for protecting data of an in-memory database IMD is shown. As discussed in the context of FIG. 1, the in-memory database system 1 includes a server 2 on which the in-memory database IMD is running. The server 2 is connected to a storage mean 3 via a bidirectional data bus 4, which is adapted to transmit data from the server 2 to the storage mean 3 and vice versa. The storage mean 3 may be an internal storage of the server 2, e.g. a hard disk or an external storage device.

In addition, the server 2 also includes a savepoint managing entity 2.1 as indicated above. The savepoint managing entity 2.1 is adapted to trigger a savepoint mechanism which generates a first savepoint SP1. Preferably the storage mean 3 includes a persistent storage device, preferably a first and second persistent storage 3.2, 3.3. When performing the savepoint mechanism, a first savepoint SP1 is saved on the first persistent storage 3.2. During the operation of the in-memory database IMD, i.e. while handling queries directed to the in-memory database IMD, the first savepoint SP1 is dynamically updated by the savepoint mechanism. Therefore the first savepoint SP1 provides actual data of the in-memory database IMD for recovery purposes.

Preferably, the savepoint managing entity 2.1 is adapted to monitor the generation of the first savepoint SP1, especially if the first savepoint SP1 has already reached consistency. If consistency of the first savepoint SP1 is reached, the data of the first savepoint SP1 are secured to a second savepoint SP2. In other words, a backup of data of the first savepoint SP1 is generated which is saved as a second savepoint SP2.

Preferably the procedure of securing the data of the first savepoint SP1 to the second savepoint SP1 is performed by using upper-mentioned flashcopy or snapshot technology. Thereby the second savepoint SP2 may be built within a short period of time, e.g. within some seconds. After triggering the backup, the first savepoint SP1 may be immediately updated. As may be obvious for a person skilled in the art, additional backups of the first savepoint SP1 or a cascade of savepoints may be generated, e.g. three savepoints, wherein the savepoints differ in their actuality of data. For example, when updating the data of the first savepoint SP1, the second savepoint SP2 receives the data prior contained in the first savepoint SP1 and the third savepoint receives the data prior contained in the second savepoint SP2. So, there is a downward actuality with increasing number of stored savepoints.

Backing up the first savepoint SP1 at a point of time, when the first savepoint SP1 has reached consistency, a consistent second savepoint SP2 is generated. The restoring of the in-memory database IMD may be based on data of the first or second savepoint SP1, SP2. Preferably, the savepoint managing entity 2.1 is adapted to check the consistency of data of the first or second savepoint SP1, SP2. If restoring of the in-memory database IMD is needed, the savepoint managing entity 2.1 may check, if the data of the first savepoint SP1 are consistent. If the savepoint managing entity 2.1 detects consistency, the in-memory database IMD is restored based on the data of said first savepoint SP1 because those data are the most actual ones (as indicated by arrow 6a). In most cases, the data of the first savepoint SP1 may not be consistent when restoring is needed. However, the data of the second savepoint SP2 may be consistent because they were generated based on consistent data of first savepoint SP1. Therefore, in case of non-consistent data of the first savepoint SP1, the data of the second savepoint SP2 are used for restoring the in-memory database system (as indicated by arrow 6b). While restoring in-memory database, the in-memory database will be populated with data of the first or second savepoint SP1, SP2 and thereby recovered. If there are further savepoints available (e.g. third, fourth, fifth etc.), of course, also the further savepoints may be used for restoring the in-memory database IMD.

As discussed in the context of FIG. 1, the data of the in-memory database IMD may be secured by using a conventional backup mechanism. Thereby the whole data of the in-memory database IMD are stored on the additional backup storage 10.

Figure 3:
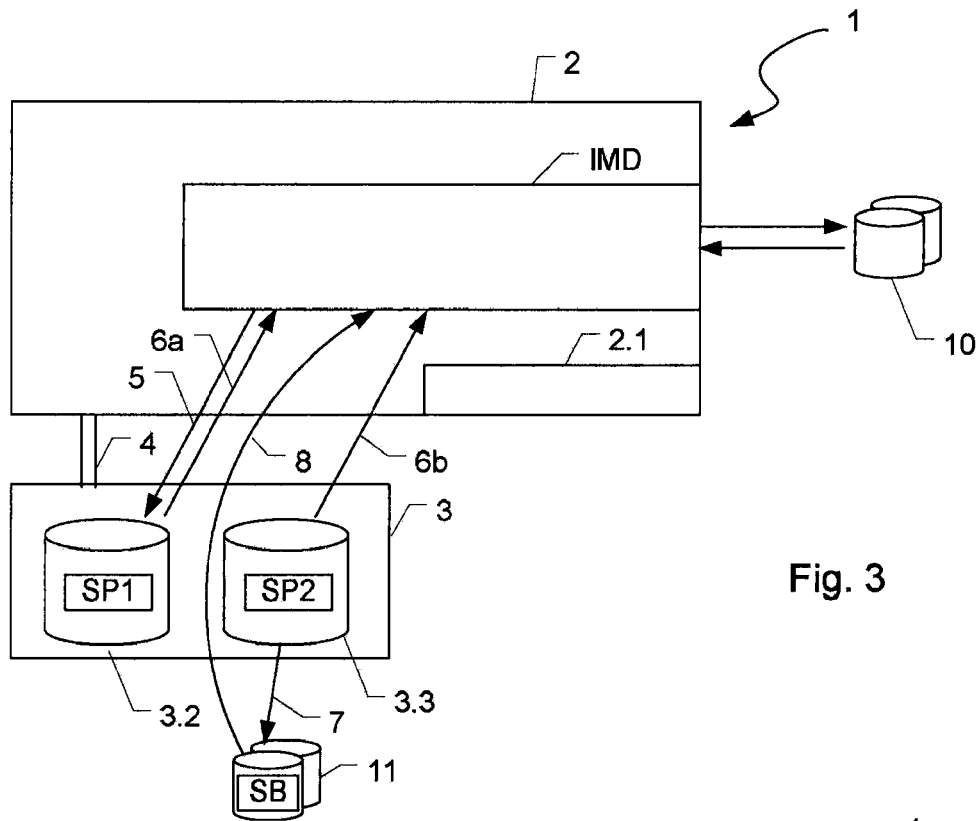
FIG. 3 shows the second schematic architecture of an in-memory database system with savepoint backup device according to an embodiment of the invention.

FIG. 3 shows in-memory database system 1 including an additional savepoint backup storage 11. The storage 3.3 used for saving the second savepoint SP2 is connected to the additional savepoint backup storage 11 which may be built by any persistent storage entity, especially by a set of hard disks. Preferably the savepoint backup storage 11 is built by a further persistent storage medium which is different to the persistent media storing the first and second savepoint SP1, SP2. After storing data of the first savepoint SP1 to the second savepoint SP2, a backup mechanism may be started to back up the data of the second savepoint SP2, i.e. store the data to the additional savepoint backup storage 11 (as indicated by arrow 7) as a savepoint backup SB. The backup mechanism may be also scheduled at certain points of time, e.g. daily, weekly, etc. After performing the backup process, the savepoint backup SB stored within the additional savepoint backup storage 11 may be used for recovery purposes as well (as indicated by arrow 8).

For normal operations, the probability of having a need to recover the in-memory database based on the savepoint backup SB is close to zero, since the securing of data of the first savepoint SP1 to the second savepoint SP2, i.e. the replication of the first savepoint ensures that restoring the data of the in-memory database IMD based on the second savepoint SP2 is possible all the time with the exception of major software or hardware defects. Therefore, the savepoint backup SB is mainly for disaster recovery purposes, i.e. to restore the data in case the whole system got damaged or lost.

The concept of backing up the first savepoint, i.e. providing at least two alternated savepoints allows a decoupling of the backup process from the operation of the in-memory database. The only restriction when performing the backup mechanism to generate the savepoint backup SB is that the second savepoint SP2 may not be updated based on the first savepoint SP1 during the backup mechanism is running. However, in-memory database IMD may run and the first savepoint SP1 may be generated without any restriction. So, the impact of the backup on the in-memory database IMD is minimized.

Figure 4:
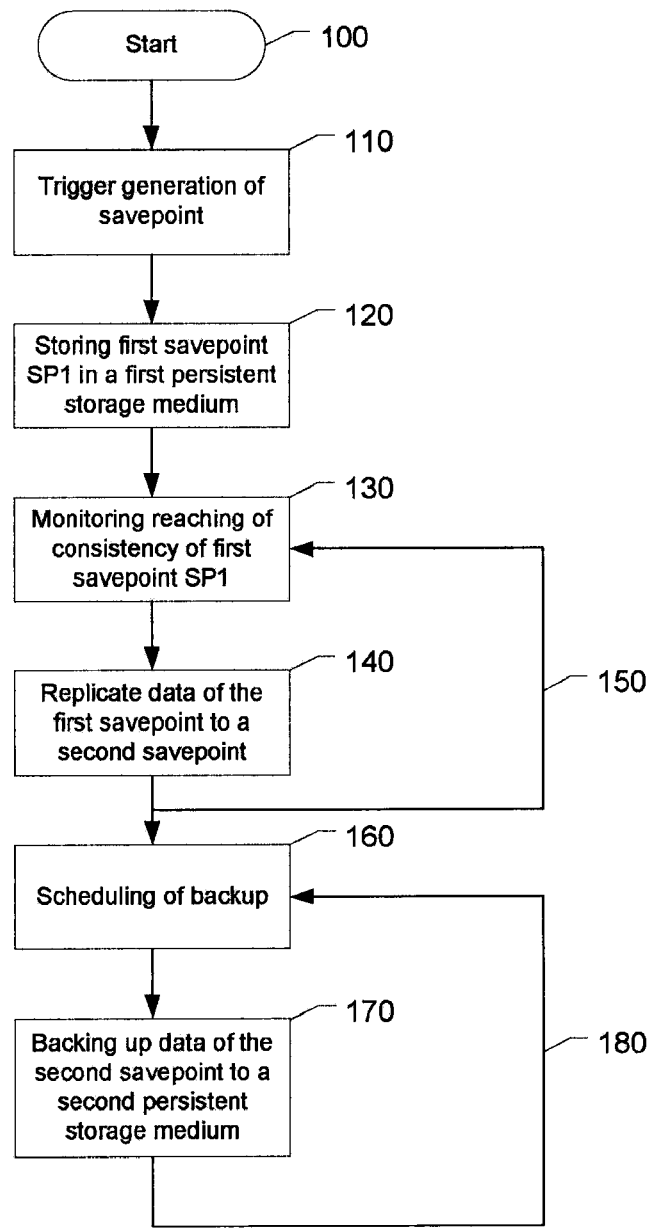
FIG. 4 shows a schematic flow-chart for protecting data of an in-memory database system according to an embodiment of the invention.

The method of generating first and second savepoint SP1, SP2 and the savepoint backup SB is explained in detail with reference to FIG. 4. At the beginning the in-memory database IMD is running on the server 2 handling database requests (block 100). The in-memory database IMD includes a savepoint mechanism for generating savepoints. Preferably, savepoints documenting the state of the in-memory database IMD at a certain point of time are generated triggered by certain events or generated periodically (block 110). The savepoint managing entity 2.1 of server 2, which is preferably built by a software component, monitors the generation of savepoints and directs the saving process of the savepoint to the first storage medium 3.2. Thereby the first savepoint SP1 is generated on the first storage medium 3.2 (block 120). Furthermore, the savepoint managing entity 2.1 verifies the achievement of consistency of the first savepoint SP1 (block 130). After consistency was reached, the data of the first savepoint SP1 are saved as a second savepoint SP2 preferably on a different persistent storage medium, i.e. a replication of data of the first savepoint SP1 on a different persistent storage medium is initiated. After replicating the data, the replication process may be iterated after the first savepoint has reached consistency again (as indicated by arrow 150). Also scheduling the replication process within certain intervals or after happening of certain events may be possible.

After generating second savepoint SP2, the data of the second savepoint SP2 may be scheduled for being backed up (block 160). After performing the backup, the data of the second savepoint SP2 are stored as savepoint backup SB to a further persistent storage (block 170). Preferably, the data of the first savepoint SP1, the second savepoint SP1 and the savepoint backup SB are stored on different storage media to enhance the availability of restore or recovery device. The backup process may be performed iteratively within certain intervals (as indicated by arrow 180).

As long as the backup process is running the replication of data from the first savepoint SP1 to the second savepoint SP2 may be inhibited, i.e. the update of the data of the second savepoint SP2 based on data of the first savepoint may be blocked.

Figure 5:
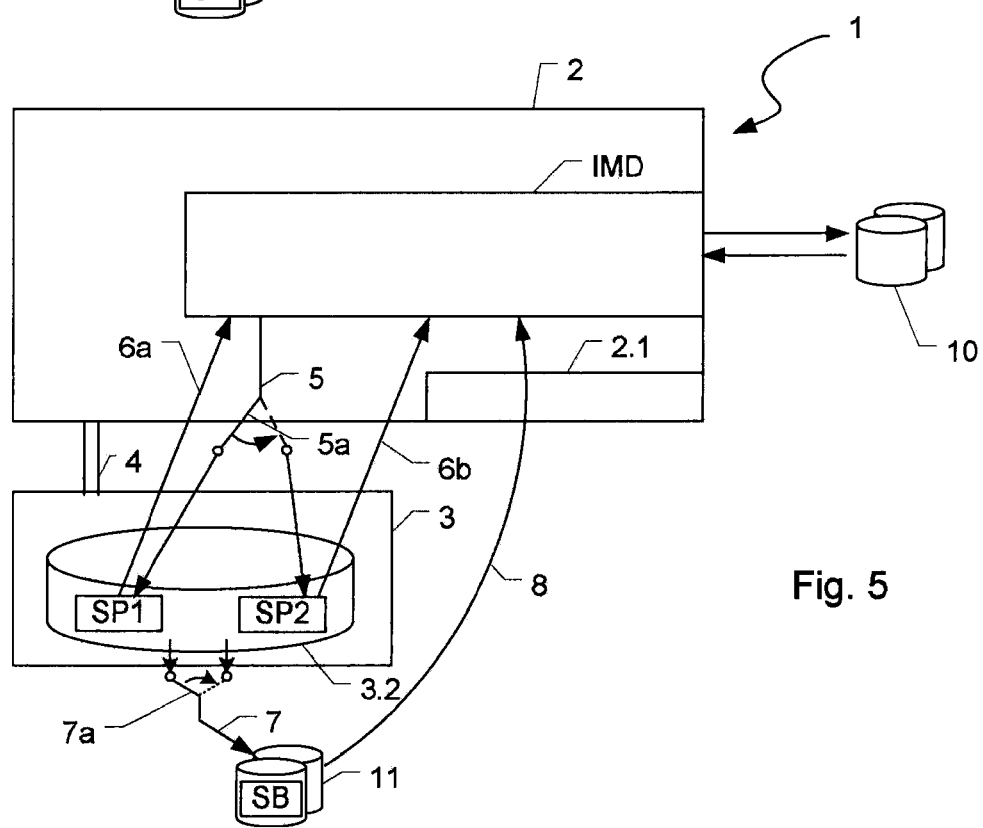
FIG. 5 shows a third schematic architecture of an in-memory database system with savepoint backup device according to an embodiment of the invention.

FIG. 5 shows a third embodiment for protecting data of an in-memory database IMD. The third embodiment also uses two different save points, namely a first savepoint SP1 and a second savepoint SP2. The main difference of the third embodiment with reference to the second embodiment is the way of generating and updating the second savepoint SP2. With respect to all other features of the third embodiment, reference is made to the above disclosure with respect to the second embodiment (FIG. 2 and FIG. 3).

As for the second embodiment, the server 2 also includes a savepoint managing entity 2.1. The savepoint managing entity 2.1 is adapted to trigger a savepoint mechanism which generates a first savepoint SP1 using a saving process (as indicated by arrow 5). When performing the savepoint mechanism, the first savepoint SP1 is saved on the persistent storage 3.2. During the operation of the in-memory database IMD, i.e. while handling queries directed to the in-memory database IMD, the first savepoint SP1 is dynamically updated by the savepoint mechanism. Therefore the first savepoint SP1 provides actual data of the in-memory database IMD for recovery purposes.

Preferably, the savepoint managing entity 2.1 is adapted to monitor the generation of the first savepoint SP1, especially if the first savepoint SP1 has already reached consistency. If consistency of the first savepoint SP1 is reached, the saving process is switched to the second savepoint SP2, i.e. the data of the in-memory database IMD are secured to the second savepoint SP2 (as indicated by switch 5a). In other words, the saving process is redirected to the prior consistent second savepoint SP2 and the first savepoint SP1 is reassigned by the savepoint managing entity 2.1 to become a consistent savepoint. While providing a set of alternating savepoints (at least two savepoints) and controlling the intermittent assignment of the saving process to one of the set of savepoints, always a consistent savepoint is available for recovery purposes. Preferably the first and second savepoint is stored in the same persistent storage 3.2.

Switching the saving process from the first savepoint SP1 to the second savepoint SP2 at a point of time, when the first savepoint SP1 has reached consistency, the data of the first savepoint SP1 after the switching operation are consistent. The restoring of the in-memory database IMD may be based on data of the first or second savepoint SP1, SP2. Preferably, the savepoint managing entity 2.1 is adapted to check the consistency of data of the first or second savepoint SP1, SP2. If restoring of the in-memory database IMD is needed, the savepoint managing entity 2.1 may check, if the data of the most recently updated savepoint are consistent. If the savepoint managing entity 2.1 detects consistency, the in-memory database IMD is restored based on the data of the most recently updated savepoint because those data are the most actual ones (as indicated by arrow 6*a*). In most cases, the data of the most recently updated savepoint may not be consistent when restoring is needed. However, the data of the further savepoint may be consistent. Therefore, in case of non-consistent data of the most recently updated savepoint, the data of the further savepoint are used for restoring the in-memory database system (as indicated by arrow 6*b*). While restoring in-memory database, the in-memory database will be populated with data of the first or second savepoint SP1, SP2 and thereby recovered. If there are further savepoints available (e.g. third, fourth, fifth etc.), of course, also the further savepoints may be used for restoring the in-memory database IMD.

The in-memory database system 1 further includes an additional savepoint backup storage 11. The storage 3.2 used for saving first and second savepoint SP1, SP2 is connected to the additional savepoint backup storage 11 which may be built by any persistent storage entity, especially by a set of hard disks. Preferably the savepoint backup storage 11 is built by a further persistent storage medium which is different to the persistent media storing the first and second savepoint SP1, SP2. After switching the saving process and thereby deriving a consistent savepoint, a backup mechanism may be started to back up the data of the consistent savepoint, i.e. store the data to the additional savepoint backup storage 11 (as indicated by arrow 7) as a savepoint backup SB. As indicated by arrow 7*a*, the backup process may be switched between the first and second savepoint SP1, SP2, depending on which savepoint is the consistent one and therefore may be used for backup process. The backup mechanism may be also scheduled at certain points of time, e.g. daily, weekly, etc. After performing the backup process, the savepoint backup SB stored within the additional savepoint backup storage 11 may be used for recovery purposes as well (as indicated by arrow 8).

While certain embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for data protection of an in-memory database (IMD) that stores data in volatile memory, the method comprising the following:

triggering, by a savepoint managing entity of a server that is connected to the IMD, generation of a first savepoint, wherein the first savepoint is generated from the data stored in the volatile memory of the IMD, wherein the first savepoint is stored on a first persistent storage medium;

while the first savepoint is being generated, monitoring, by the savepoint managing entity, the generation of the first savepoint to detect when data of the first savepoint stored on the first persistent storage medium becomes consistent with the data stored in the volatile memory of the IMD;

in response to detecting that the data of the first savepoint has become consistent with the data stored in the volatile memory of the IMD, triggering, by the savepoint managing entity, generation of a second savepoint, wherein the second savepoint is generated by backing up the data of the first savepoint stored on the first persistent storage medium and storing the backup as the second savepoint to a second persistent storage medium; and after triggering the generation of the second savepoint, triggering, by the savepoint managing entity, an update of the first savepoint during operation of the IMD while the second savepoint is being generated, wherein the updating of the first savepoint includes changing parts of the first savepoint stored on the first persistent storage medium that correlate with changed parts of the data stored in the volatile memory of the IMD, wherein the data of the second savepoint is backed up onto a third persistent storage medium as a third savepoint backup when the updating of the first savepoint is being performed.

2. The method according to claim 1, wherein the data of the first savepoint is backed up nearly instantaneously using flashcopy or snapshot technology.

3. The method according to claim 1, wherein the backing up the data of the first savepoint to the second savepoint is controlled by the savepoint managing entity which initiates the generation of a snapshot of the first savepoint and the backing up of the snapshot data to the second persistent storage medium as the second savepoint.

4. The method of claim 1, wherein the data of the IMD is recovered from the data of the first savepoint if the data of first savepoint is detected to be consistent, wherein the data of the IMD is recovered from the second savepoint if the first savepoint is detected to be non-consistent.

5. The method according to claim 1, wherein the data of the IMD is recovered from the data of the third savepoint backup if the data of the first and second savepoint are detected to be non-consistent.

6. The method claim 1, wherein the data of the IMD is additionally backed up by directly storing the data of the IMD onto a persistent storage medium.

7. The method of claim 1, wherein the IMD distributed over multiple computing entities.

8. A computer program product for data protection of an in-memory database, wherein the IMD comprises data that is stored in volatile memory, the computer program product comprising a non-transitory computer readable storage medium having program code embodied therewith, the program code executable by a computer to perform a method comprising:

triggering, by a savepoint managing entity of a server that is connected to the IMD, generation of a first savepoint, wherein the first savepoint is generated from the data stored in the volatile memory of the IMD, wherein the first savepoint is stored on a first persistent storage medium;

while the first savepoint is being generated, monitoring, by the savepoint managing entity, the generation of the first savepoint to detect when data of the first savepoint stored on the first persistent storage medium becomes consistent with the data stored in the volatile memory of the IMD;

in response to detecting that the data of the first savepoint has become consistent with the data stored in the volatile memory of the IMD, triggering, by the savepoint managing entity, generation of a second savepoint, wherein the second savepoint is generated by backing up the data of the first savepoint stored on the first persistent storage medium and storing the backup as the second savepoint to a second persistent storage medium; and after triggering the generation of the second savepoint, triggering, by the savepoint managing entity, an update of the first savepoint during operation of the IMD while the second savepoint is being generated, wherein the updating of the first savepoint includes changing parts of the first savepoint stored on the first persistent storage medium that correlate with changed parts of the data stored in the volatile memory of the IMD, wherein the data of the second savepoint is backed up onto a third persistent storage medium as a third savepoint backup when the updating of the first savepoint is being performed.

9. The computer program product of claim 8, wherein the data of the first savepoint is backed up nearly instantaneously using flashcopy or snapshot technology.

10. The computer program product of claim 8, wherein the backing up the data of the first savepoint to the second savepoint is controlled by the savepoint managing entity which initiates the generation of a snapshot of the first savepoint and the backing up of the snapshot data to the second persistent storage medium as the second savepoint.

11. A computer-based database system for protecting data of an in-memory database (IMD), comprising:
   a database server;
   volatile memory within the database server which stores data of the IMD;
   a first persistent storage medium;
   a second persistent storage medium; and
   a processor configured to:
      trigger generation of a first savepoint, wherein the first savepoint is generated from the data stored in the volatile memory of the IMD, wherein the first savepoint is stored on the first persistent storage medium;
      monitor the generation of the first savepoint while the first savepoint is being generated to detect when data of the first savepoint stored on the first persistent storage medium becomes consistent with the data stored in the volatile memory of the IMD;
      in response to detecting that the data of the first savepoint has become consistent with the data stored in the volatile memory of the IMD, trigger generation of a second savepoint, wherein the second savepoint is generated by backing up the data of the first savepoint stored on the first persistent storage medium and storing the backup as the second savepoint to the second persistent storage medium; and
      after the generation of the second savepoint is triggered, trigger an update of the first savepoint during operation of the IMD while the second savepoint is being generated, wherein the update includes changing parts of the first savepoint stored on the first persistent storage medium that correlate with changed parts of the data stored in the volatile memory of the IMD.

* * * * *